Patented Feb. 13, 1940

2,189,805

UNITED STATES PATENT OFFICE 2,189,805

ALKYL PHENOLS AND METHOD OF MANUFACTURING THE SAME

Lucas P. Kyrides, Webster Groves, Mo., assignor to Monsanto Chemical Company, St. Louis, Mo., a corporation of Delaware No Drawing. Application January 7, 1935, Serial No. 778

19 Claims. (Cl. 260—624)

This invention relates to the alkylation of phenols and it has particular relation to alkylation thereof by means of unsaturated hydrocarbons.

The main objects of the invention are to provide:

A process of alkylation of phenols with unsaturated hydrocarbons in which the use of large amounts of corrosive carrier agents is eliminated;

A process of alkylating phenols with unsaturated hydrocarbons in which use of large amounts of alkali or soda ash for purposes of neutralizing the carrier agent employed is obviated;

A process of alkylating phenols in which the step of washing the reacting product prior to distillation is avoided;

A process by means of which ortho alkylated phenols may be, at will, transformed into the corresponding para compounds;

A process of preparing mono or poly alkylated phenols in which the formation of resinous by-products and ethers at elevated temperatures does not occur;

A process by means of which olefines obtained by condensing two or more molecules of a tertiary olefine may be reacted with phenol to form a mono tertiary alkyl phenol;

A process of alkylating phenols which is simple and inexpensive in character and which results in high yields of an exceptionally pure product.

These and other objects will be apparent by perusal of the appended specification.

The high power of alkylated phenols as antiseptics and their relatively low toxicity to higher forms of life have heretofore been noted.

It has also been noted that they may be sulfonated to form valuable moth proofing agents, detergents or wetting agents, or they may be condensed with aldehydes to provide oil soluble artificial resins of the "Bakelite" type. However, no entirely satisfactory method of preparing these alkylated phenols has heretofore been available.

A method heretofore preferred, of preparation of these compounds involves alkylation of phenols with tertiary unsaturated hydrocarbons in the presence of large (approximately molar) amounts of sulfuric acid as a carrier for the unsaturated hydrocarbon. British Patent 409,111 discloses alkylation of phenols with unsaturated olefines using as low as 0.075 mol of sulfuric acid to catalyze the reaction. However, such processes, even with the latter amounts of acid, have been found to be objectionable because the use of large amounts of sulfuric acid entails a considerable item of expense and entails ether and resin formation at elevated temperatures. Moreover, where such processes were employed it was necessary to split off the sulfonic acid group that forms and neutralize this acid with sodium carbonate at the end of the reaction, and then to wash out the salts with water or other solvent. This, of course, involved additional expense and labor, and resulted in a loss of some of the product. The process was also objectionable because, as noted in the patent, even at moderate temperatures of 70° C. or 80° C. it tended to induce formation of resins and sulfonic acids. Even with the concentrations of acid specified in the British patent above noted, working temperatures of about 25° C. are recommended and apparently if the temperature exceeded 70° C., formation of resins, ethers and the like was excessive. In an article by Natelson (J. A. C. S., vol. 56, page 1585) temperatures below 10° C. are recommended.

The present invention involves the discovery that a mere trace of strongly acid material, such as sulfuric acid, sulfonic acid or other strongly acid materials or salts thereof with weak bases, iodine, etc., is sufficient efficiently to catalyze the above reaction. Under these conditions, necessity of any substantial neutralization or washing of the final product and material formation of objectionable by-products even at temperatures of 100° C. and above is obviated. The term "trace" as herein employed connotes amounts of the order of one per cent or preferably less of acid or its mol equivalent of acid radical based upon phenol present.

The invention further involves the discovery that alkylated phenols obtained by condensation of a phenol with olefines resulting from condensation of two or more molecules of a tertiary olefine, such as isobutylene or ter. amylene, and the influence of heat, a trace of strongly acidic material and preferably in the presence of an excess of phenol may readily be reacted to form the corresponding mono tertiary alkyl phenols.

It also involves the discovery that ortho-alkylated phenols may, at will, be converted into para compounds merely by subjecting them to heat in the presence of traces of strongly acidic materials.

In this process of preparing alkylated phenols, the reaction may be carried out at ordinary temperatures and up to the boiling point of the phenol under atmospheric pressure, and if pressure is used, still higher temperatures may be employed. The lower temperatures of reaction (around 40° C. or 50° C. or lower) favor the formation of the ortho-alkylated phenol, while higher temperatures favor the formation of the para compound. An excess of phenol in the reaction is found to promote the formation of the mono-alkylated compounds, while in the presence of molar ratios of the components, large amounts of the di-alkylated phenol ($R_2C_6H_3OH$ compounds) are also formed.

The merest trace of a strongly acidic material such as sulfuric acid is effective in causing the reaction and in general approximately one drop of concentrated acid per 100 g. of phenol is sufficient. The quantity may even be as low as about one drop for three or four hundred grams of phenol and excellent results are obtained with approximately 0.0005% of acid based upon the weight of phenol and it should not exceed approximately 1% upon the same basis.

The following constitute specific examples of applications of the principles of the invention:

*Example 1.*—Phenol and di-isobutylene in the ratio of 800 grams of the former to 151 grams of the latter are heated with 8 drops of sulfuric acid (concentrated) in a glass container at a temperature of about 120° C. for a period of approximately 22 hours. Sodium carbonate (approximately 0.5 gram) is added to neutralize any trace of acid present and the mixture is subjected directly to fractionation under vacuum. At a pressure of 28 mm. absolute excess phenol distills off within a temperature range of 95° C.–130° C. Between 130° C.–160° C. 6 grams of a liquid fraction comes over which may contain the ortho-di-isobutylphenol (ortho-tertiary-octyl phenol). The para di-isobutylphenol (para-tertiary-octyl phenol) of the probable formula:

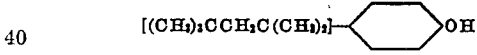

is collected, distilling above the latter temperature and the major portion of it is obtained within the range of 170° C.–174° C. This fraction crystallizes within the temperature range of 78° C.–79° C. and may be further purified by crystallization from a petroleum solvent. The alkylated phenol fraction weighs approximately 256 grams and represents a yield of 92.5% based upon the quantity of di-isobutylene employed. The residue weighs only about 2 grams, showing that the loss of both phenol and di-isobutylene from resinification or formation of other by-products is practically negligible. If, in this reaction, isobutylene is slowly introduced into the phenol through a porous distributor tertiary butylphenol is formed. If phenol is alkylated with di-isobutylene or di-isobutylphenol (tertiary-octyl phenol) is heated with phenol at a fairly high temperature (e. g., of the order of 140° C.–170° C. more or less) mono tertiary butylphenol results.

By heating ortho tertiary butylphenol to a temperature of the order of 140° C. or above in the presence of a trace of a strongly acidic material, rearrangement to the para compound occurs.

It is likewise possible to obtain para di-isobutylphenol (para-tertiary-octyl phenol) by subjecting approximately 350 grams of phenol to reaction with 77 grams of di-isobutylene in the presence of two or three crystals (approximately 0.2 gram) of iodine (about 0.2 gram). The reaction is preferably conducted at a temperature of about 120° C. with agitation.

Where methylcyclohexene is employed as the unsaturated hydrocarbon, the following conditions are found to give satisfactory results:

*Example 2.*—About 800 grams of phenol, together with .25 cc. of sulfuric acid are heated at 140° C. with agitation in a vessel equipped with a reflux condenser. 150 grams of methylcyclohexene are added slowly and as refluxing subsides the temperature is raised to and maintained at 150° C. for a period of about 20 hours. The reaction product is then neutralized by the addition of a trace of sodium carbonate and the product fractionally distilled under vacuum. The phenol fraction comes over first and after this about 15 grams of a liquid, having a boiling point of 140° C.–170° C. is obtained which contain presumably the ortho isomer. The para (methylcyclohexyl) phenol fraction in a yield of approximately 240 grams distills over at a temperature of 188° C.–195° C. at 32 mm. This fraction solidifies during distillation and amounts to 81% of the theoretical yield from the methylcyclohexene. It may readily be purified by crystallization from petroleum hydrocarbons (e. g., petroleum ether) and shows a melting point corresponding to that of pure para (methylcyclohexyl) phenol.

Di-amylphenol of the probable formula $(C_5H_{11})_2C_6H_3OH$ is obtained in a similar manner by treatment of phenol or tertiary amylphenol with trimethylethylene in accordance with the following procedure:

*Example 3.*—A 306 gram portion of para tertiary amylphenol was treated with 6 drops of sulfuric acid and heated with agitation and under a reflux condenser to a temperature of 125° C.–130° C. About 100 grams of gaseous trimethylethylene was then added over a period of five hours to the reaction mixture by bubbling it beneath the surface thereof through an alundum distributor (should the reaction slow down a few drops more of sulfuric acid is added). The reaction was then continued for approximately one hour longer, after which a little sodium carbonate was added to neutralize any acid present and the product was fractionally distilled under vacuum. Approximately 92 grams of para tertiary amylphenol, having a boiling point of 150° C.–165° C. at 35 mm. were recovered. This was followed by an intermediate fraction amounting to approximately 17.5 grams having a boiling point of 165° C.–179° C. Di-amylphenol was obtained, boiling at 179° C.–185° C., in the amount of 258 grams. The residue after distillation amounted to 7 grams. The yield of di-amylphenol, based on the amylene used was approximately 77%. This yield can be increased to practically quantitative value by introducing the amylene at such rate that none of it escapes from the reaction vessel. Di-amylphenol can also be made directly from phenol by alkylating it with the required amount of trimethylethylene.

*Example 4.*—The reaction of trimethylethylene with phenol at 50° C. whereby material amounts of ortho substituted phenol resulted, was conducted as follows: 1740 grams of phenol were treated with 10 drops of sulfuric acid and agitated at 50° C. under a reflux condenser. Trimethylethylene vapor in the amount of 233 grams was then introduced into the reaction mass through an alundum distributor over a period of 3½ hours. A considerable amount of heat of reaction was generated and it was necessary occasionally to cool the reaction flask in order to maintain the temperature at the required value. In this example the agitation at this temperature was continued overnight (a period of about 15 hours) and at the end of this period sufficient sodium carbonate was added to neutralize the reaction product. The reaction mixture was then fractionated under reduced pressure. The phenol fraction was collected at a temperature range of 85° C.–103° C., the major portion coming over at 85° C. A fraction amounting to 5 grams and having a boiling range of 103°–124° C. was next obtained and this was followed by a 206 gram fraction boiling within the range of 124° C.–129° C. This latter fraction was found to be completely soluble in dilute sodium hydroxide and consisted essentially of ortho tertiary amylphenol. A fraction of approximately 14 grams, having a boiling range of 129° C.–140° C., was then separated. At the latter temperature (140° C.) the product began to crystallize, indicating the presence of the para isomer. This latter product was then collected as a 210 gram fraction boiling at a temperature of 144° C.–146° C. and crystallized at 88.5° C. The product obtained by the present process, upon crystallization from petroleum ether, was found to have a melting point of 93° C. to 94° C. which agrees with the value given by the literature for para tertiary amylphenol.

The residue from the above fraction was transferred to a small flask and subjected to further distillation whereupon 63 grams of a liquid boiling at a temperature of 167° C.–169° C. under 20 mm. pressure was obtained, and apparently comprised essentially diamylphenol. Accordingly, it appears that diamylphenol was formed at this temperature even in the presence of a large excess of phenol, but the proportion thereof, of course, can be further reduced by increasing the excess of phenol over the olefine employed. The total yield of alkylated products is very nearly quantitative from the amylene used as well as the phenol. At the temperature of reaction employed, ortho and para tertiary amylphenol are obtained in about equal amounts. If the reaction is conducted at a temperature of 85° C.–90° C. under otherwise identical conditions, the proportion of para isomers is slightly greater and if the temperature is raised to near the boiling point of phenol (in the presence of an excess of the latter) the para tertiary amylphenol is formed almost exclusively.

It was found that the ortho tertiary alkylphenol may be easily and economically converted to the para tertiary alkyl product. This may be effected as follows:

*Example 5.*—The ortho tertiary amylphenol was carefully fractionated and the fraction boiling at 119° C.–120° C. at 17 mm. absolute pressure was isolated. This fraction was observed to be completely soluble in dilute sodium hydroxide which indicates that the product was free from any substantial amount of ether. One hundred grams of the ortho tertiary amylphenol were mixed with 500 grams of phenol to which five drops of sulfuric acid had been added. The temperature was raised to 170° C. and maintained at this temperature overnight. Sodium carbonate was then added to neutralize the acid and the products were subjected to fractionation at about 16 mm. absolute pressure. Phenol came over at 82° C. and after that the temperature rose sharply to above 130° C. A 91 gram fraction boiling at a substantially constant temperature of 137° C. was then obtained. This fraction crystallized at 92° C. and on recrystallization from petroleum ether exhibited a melting point of 95° C. A mixed melting point determination with pure para tertiary amylphenol did not show any change in this value. Obviously, therefore, the ortho isomer was substantially completely transformed into the para product. The ortho compound may also be subjected directly to rearrangement without separation from the other materials present, if so desired.

The di-alkylated compounds (e. g., amylphenols) may be employed to alkylate further amounts of phenol and simultaneously they are partially de-alkylated to form mono-alkyl materials. The following example is illustrative of this process:

*Example 6.*—Some diamylphenol $(C_5H_{11})_2C_6H_3OH$ was subjected to fractionation whereby a main fraction having a boiling point of 159° C.–160° C. at 16 mm. absolute pressure was obtained. A 100 gram portion of this fraction was mixed with 547 grams of phenol and 5 drops of sulfuric acid were added thereto. The mixture was then heated at a temperature of 170° C. overnight (about 15 hours) and after the addition of enough sodium carbonate to neutralize the excess acid, it was subjected to fractionation. The para tertiary amylphenol was obtained as a 133 gram fraction, crystallizing at a temperature of 92° C. Substantially no residue remained after crystallization and this fact indicated that the diamylphenol was transformed substantially quantitatively into the mono tertiary amyl product. It is apparent from the discussions given above that the addition of the ortho isomer or of the di-tertiary alkylphenol to the main reaction will not increase or decrease the ratios of these components formed by the reaction since these are a function of the amount of phenol present and also the temperature conditions.

It will be apparent to those skilled in the art that the reaction is not limited to the use of the specific phenol disclosed in the above examples but that various substituted phenols having free ortho and/or para positions which contain the essential nucleus of phenol, but in addition also contain various radicals and groups substituted for hydrogen in the benzene nucleus may be employed in any of the above examples. The following are typical of such phenols: hydroquinone, resorcinol, chlor-resorcinol, pyrocatechol, guaiacol, ortho or para chlorphenol, the cresols, naphthol, ortho or para phenylphenol, ortho or para benzylphenol, etc. These, of course, include the various isomers of these compounds which are possible and known to the art. Likewise, substantially any of the ordinary tertiary olefine compounds may be reacted with any of the phenols herein listed. These include in addition to the ones given in the above examples: pinene, dimethylcyclohexene (derived from hydrogenated xylenols), as well as other tertiary olefines. Mixtures of the various ingredients are also within the purview of the invention. For example, any two or more of the above phenols may be mixed together and then caused to react with any olefine or with mixtures thereof. Mixtures of any of the tertiary olefines may also be reacted with any one of the phenols. Mixtures of olefines suitable for the reaction may well be obtained from the cracking of petroleum, a satisfactory mixture being obtained by treating the crude olefinic product from the cracking operation with maleic anhydride to absorb diolefines and then separating the desired product by fractionation or in other conventional manner.

The reactions described may be conducted in the presence of inert solvents or diluents including benzene. Where the reaction is conducted at relatively low temperatures, e. g., around 40° C. or below with phenols having high melting points, these solvents may be necessary in order to provide a homogeneous mixture. Similar results may be obtained by the addition of alkylated phenols, (e. g. tertiary butylphenol) to the reaction mixture. These reduce the melting point and admit of operation at relatively low temperatures. Water, for example that occurring in moist of wet phenol, may be present. Pressures above atmospheric may be used and are desirable where high temperatures are employed. Where high pressures and temperatures are employed in these reactions care must be observed to prevent the temperature from becoming so great as to cause charring of the ingredients.

In the examples given, sulfuric acid was indicated as constituting the catalyst. It is found to be exceptionally efficient for this purpose because it is highly active and is required in only minute traces. Also, the boiling point thereof is so high that it does not volatilize during the course of the reaction. It is likewise quite feasible to employ various derivatives of sulfuric acid in the same manner. For example, alkyl sulfuric acid, sulfonic acids such as may be obtained by sulfonation of benzene, toluene, phenol, toluol, naphthol and the like may be employed.

It is even probable that at least at the higher temperatures of reaction, sulfuric acid reacts with the phenol or the olefine with which it contacts to form sulfonates or acid alkyl sulfates which then act as promoters of the reaction.

Sulfuric or sulfonic acid salts of weak bases, such as urea or aniline are also applicable. Other strongly acid catalysts which may be used in mere traces are: phosphoric acid, phosphorous pentoxide, phosphorous trichloride, thionyl chloride, sulfur trioxide, hydrobromic acid, iodine and hydrochloric acid, and salts of easily hydrolyzable metals such as zinc chloride and aluminum chloride. Examples of the use of hydrogen chloride, hydrogen bromide, zinc chloride, aluminum chloride and small amounts of alkyl chloride are included in applicant's copending case Serial Number 727,881, filed May 28, 1934 (Examples 8 to 12), appended as

*Example 7.*—727 grams of dry or substantially dry phenol, such as is obtained by fractional distillation, are saturated at 80° C.–85° C. with dry hydrogen chloride. For this purpose very little hydrogen chloride is necessary. Subsequently 100 grams of di-isobutylene, which may be obtained conveniently by condensing 2 mols of isobutylene and which may be represented structurally as follows:

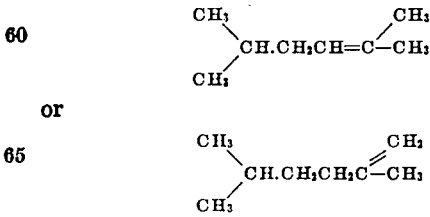

depending upon the isomer form, are added while maintaining the previous temperature and agitated condition. From time to time a small amount of hydrogen chloride is introduced into the reaction mixture to assure saturation. After about 18 hours the product is fractionated. 170 grams of di-isobutyl phenol (tertiary-octyl phenol), boiling at approximately 157° C. at 18 mm., is obtained, practically no residue or by-products being formed. The product crystallizes at 82.5° C. which compares favorably with that recorded in the literature, 83° C. (J. A. C. S. 1933, page 2574) and obtained by other methods. On crystallization from petroleum ether a product melting at 86° C. is obtained. The yield is equivalent to approximately 90% of theory based on the di-isobutylene and is practically quantitative based on the phenol consumed.

In lieu of di-isobutylene one may employ homologues of di-isobutylene having tertiary olefinic linkage. Di-isobutylene is made by condensing two mols of isobutylene. Tri-isobutylene, which may likewise be employed is made by condensing three mols of isobutylene.

*Example 8.*—Substitute a mol equivalent of tri-isobutylene for the di-isobutylene provided in Example 7 and otherwise proceed as described in said Example 7.

*Example 9.*—Substitute 88 grams of tetramethyl ethylene

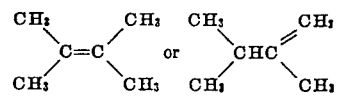

for the di-isobutylene provided in Example 7 and otherwise proceed as described in said Example 7.

*Example 10.*—In lieu of the hydrogen chloride provided in Example 7 substitute hydrogen bromide, zinc chloride or aluminum chloride or mixtures thereof in small amounts, preferably less than 1% based on the weight of the phenol, or, alternatively, add a small amount of the hydrogen halide in the form of the corresponding alkyl halide. Thus, in lieu of gaseous hydrogen halide, one may add, either during the initial stages of the reaction or preferably progressively during the course of the reaction, a small amount of the tertiary alkyl chloride corresponding to the olefine and which may be obtained by reacting the olefine with concentrated hydrochloric acid as previously described in connection with Example 3 of the aforementioned application.

*Example 11.*—165 grams of resorcinol are dissolved in a sufficient quantity of a mixture of ethyl and isopropyl ethers, the ethers being present in approximately equal parts by weight, to form a true solution at about 70° C. The resulting solution is agitated at 70° C.–75° C. and treated with a mixture of 50 grams of di-isobutylene and 5 grams of di-isobutyl chloride. The reaction is permitted to proceed for 10–14 hours, after which the reacted mixture is treated with sufficient water and benzol to dissolve resorcinol and di-isobutyl resorcinol (tertiary-octyl resorcinol), respectively. The aqueous resorcinol layer is drawn off and the benzene layer extracted three times with water to insure complete removal of the unreacted resorcinol. If desired, the resulting combined aqueous fractions may be extracted with benzol to remove any alkyl resorcinols which may be contained therein. 78.5 grams of an oil boiling at 195° C.–202° C. at 17 mm., which solidifies upon cooling, is obtained. By crystallization one obtains a product which melts at 110° C. This melting point, which is 8° higher than that reported in the literature, indicates that the product represented by the lower melting point was not very pure. The octyl resorcinol on chlorination has a very high phenol coefficient on *Staphylococcus aureus*.

Examples, 7, 8, 9, 10 and 11 are representative embodiments of my invention based on my discovery that olefines having a tertiary olefinic linkage combine directly in good yields and without by-product formation to form the corresponding alkyl phenol.

My investigation has further disclosed that the di or poly iso-alkyl olefines such, for example, as di-isobutylene or their hydrogen halide addition products, react at high temperatures with phenol to form, not the corresponding di or poly alkyl phenol as might be expected, but the corresponding mono tertiary alkyl phenol such as tertiary butyl phenol.

Some of these di and poly iso-alkyl olefines are obtained conveniently by condensing olefines, such as isobutylene, to form poly iso-alkyl olefines such as di-isobutylene, tri-isobutylene, etc. These materials and their corresponding alkyl halides react at elevated temperatures partly as the depolymerized alkyl halide which apparently combines with the phenol to form the corresponding alkyl phenol.

Di-isobutyl chloride, the preparation of which has been described in Example 3 of the aforementioned application, is added slowly to the phenol which is maintained at the boiling temperature. In addition to di-isobutyl phenol (tertiary-octyl phenol), considerable tertiary butyl phenol is formed.

1500 grams of phenol are agitated while maintaining a temperature of 160° C.–165° C. while adding dropwise 374 grams of di-isobutyl chloride. The reaction is permitted to proceed over a period of 4–8 hours. Upon fractionation one obtains first the unreacted phenol, followed by 375 grams of a fraction boiling at approximately 118° C. at 18 mm., which has a crystallizing point of 97° C. Upon crystallization from petroleum ether the product will be found to melt at 99° C. and is otherwise the same as that obtained when tertiary butyl chloride is caused to react with phenol. The fraction boiling at approximately 160° C.–163° C. at 18 mm. and amounting to 208 grams consists principally of di-isobutyl phenol (tertiary-octyl phenol).

I have also found that instead of reacting an olefine having a tertiary olefinic linkage with phenol in the presence of a trace of hydrogen halide or an acid reaction salt, such as zinc chloride, one may employ an alkyl halide which, upon splitting HCl, forms a tertiary olefinic linkage. For this purpose the halogen may be joined to the tertiary carbon atom or to the carbon atom immediately adjacent thereto and forming a part of the tertiary linkage. In the latter case the halogen may be joined to a primary or secondary carbon.

An example of a compound in which the halogen is joined to a primary carbon is ethyl hexyl chloride having the configuration:

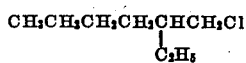

From the foregoing description it will be apparent that the quantity of carrier agent or catalyst required to effect the reaction of the unsaturated tertiary hydrocarbons with the phenols is so slight that the expense involved in the use thereof is negligible. Likewise, only a trace of alkali or sodium carbonate is required to effect neutralization thereof. Accordingly, the labor and loss attending washing of the product to remove the sodium salts is eliminated and distillation may be effected immediately after neutralization with sodium carbonate. The use of minute traces of sulfuric or sulfonic acids is further advantageous because little corrosion of the apparatus employed in conducting the reaction can occur. The formation of ethers and resins is also eliminated and exceptionally high yields of unusually pure product are thus obtained. Furthermore, by employing the principles of the invention it is possible to control the amounts of ortho or para alkylated products from it and similarly the yields of the dialkylated materials may be limited. The process is extremely simple in its nature and no complicated apparatus is required. For the above reasons it will be manifest that applicant's process is highly convenient from a commercial standpoint.

In addition to uses as germicides, the reaction products are also susceptible of numerous other practical applications. For example, they may be condensed with aldehydes to form oil soluble artificial resins. They may also be sulfonated with concentrated sulfuric acid or oleum and then neutralized with an alkali or alkali earth metal to form wetting agents of exceptional merit. For this purpose the di-alkyl phenols such as di-amyl phenol are of particular value.

Although only certain preferred embodiments of the invention have been described it is to be understood that these are merely illustrative and that numerous modifications may be made therein without departure from the spirit of the invention or the scope of the appended claims.

What I claim is:

1. A method of alkylating phenols with tertiary olefines which comprises subjecting a mixture thereof to the action of a trace not exceeding 0.1% of a catalytic material selected from a class consisting of strong acids, and their salts with weak bases and separating the phenolic constituents of the reaction mixture by fractional distillation in the presence of the catalytic material.

2. A process of alkylating phenols which comprises subjecting them to the action of a tertiary olefine in the presence of a trace not exceeding 0.1% of a material selected from a class consisting of strong acids and their salts with weak bases at a temperature ranging from ordinary to the boiling temperature of the phenol and separating the phenolic constituents of the reaction mixture by fractional distillation in the presence of the catalytic material.

3. A method of alkylating phenols which comprises subjecting them to the action of a tertiary olefine in the presence of a trace not exceeding 0.1% of sulphuric acid at temperatures ranging from ordinary to the boiling point of phenol, adding a trace of alkali and subjecting the product directly to distillation in order to separate it into fractions.

4. A method of alkylating phenols which comprises subjecting them to the action of a tertiary olefine in the presence of a trace not exceeding 0.1% of strongly acid material at temperatures ranging from ordinary room to the boiling point of the phenol, neutralizing the acid material and subjecting the resulting mixture containing the neutralized acid material to fractionation to separate the ortho and para monoalkyl phenol and finally the di-alkyl phenol.

5. A process of preparing para tertiary butyl phenols which comprises subjecting a phenol to alkylation with isobutylene at a temperature not greater than approximately 50° C., subjecting the reaction product to fractionation to separate the ortho isomers from the para isomers and subjecting the ortho isomer to further treatment with phenol in the presence of a trace of sulphuric acid at a higher temperature to form the para isomer.

6. A method of forming mono tertiary butyl phenol which comprises subjecting phenol to alkylation at an elevated temperature with diisobutylene in the presence of a trace not exceeding 0.1% of a material selected from a group consisting of sulfuric acid, alkyl sulfuric acids, sulfonic acids, and their salts with weak bases.

7. A method as defined in claim 6 in which the reaction product is subjected to neutralization with a trace of alkali and is then directly subjected to fractional distillation.

8. A method of transforming ortho alkylated phenols into para alkylated phenols which comprises subjecting the ortho material to a temperature substantially above 50° in the presence of an excess of phenol and a trace of an acid reacting material containing a strongly acidic group.

9. A method of preparing mono tertiary alkylated phenols from di-alkylated phenols which comprises subjecting a di-alkylated phenol to an elevated temperature in the presence of an excess of phenol and in the presence of a trace not exceeding 1% of an acid reacting material containing a strong acid group.

10. A method of preparing mono tertiary butyl phenols which comprises treating phenols with isobuylene in the presence of a trace not exceeding 0.1% of a catalytic material selected from a group consisting of sulfuric acid, alkyl sulfuric acids, sulfonic acids, their salts with a weak base, and iodine and separating the phenolic constituents directly by fractional distillation and without first removing the catalytic material.

11. A method of preparing mono tertiary butyl phenols which comprises treating phenols with diisobutylene in the presence of a trace not exceeding 0.1% of a material selected from a group consisting of sulfuric acid, sulfonic acid and sulfuric acid salts of weak bases at temperatures of about 140° to 150° C.

12. A method as defined in claim 10 in which the temperature is above approximately 140° C. and is below the temperature at which charring of the organic material occurs.

13. A method of preparing ortho tertiary butyl phenol which comprises alkylating phenol with isobutylene at a temperature not greater than approximately 50° C. and in the presence of a trace not exceeding 0.1% of a catalytic material selected from a class consisting of strong acids and their salts with weak bases.

14. A method as defined in claim 13 in which the catalytic material comprises sulfuric acid or a sulfonic acid.

15. A method of preparing alkylated phenols which comprises subjecting them to alkylation with a tertiary olefine hydrocarbon in the presence of a trace not exceeding 0.1% of strongly acidic material as a catalyst and at a temperature of at least 100° C. and separating the phenolic constituents of the reaction mixture by fractional distillation without first removing the catalyst material.

16. A method of treating a mixture of ortho and para alkyl phenols which comprises heating them with phenol to a temperature of at least approximately 140° C. in the presence of a trace of a strongly acidic material whereby the ortho material is rearranged to form the corresponding para compound.

17. A method as defined in claim 15 in which the acidic material is sulfuric acid.

18. A method as defined in claim 15 in which the acidic material is iodine, which acts like hydriodic acid.

19. A method of alkylating phenols with tertiary olefines which comprises subjecting a mixture thereof to the action of a trace not exceeding 0.1% of a catalytic material selected from a class consisting of strong acids, neutralizing the catalytic material and separating the phenolic constituents of the reaction mixture by fractional distillation in the presence of the neutralized catalytic material.

LUCAS P. KYRIDES.